(12) United States Patent
Pajeau

(10) Patent No.: US 8,526,694 B2
(45) Date of Patent: Sep. 3, 2013

(54) MEDICAL IMAGE PROCESSING AND REGISTRATION SYSTEM

(75) Inventor: Michael Pajeau, Barlett, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 339 days.

(21) Appl. No.: 13/012,235

(22) Filed: Jan. 24, 2011

(65) Prior Publication Data

US 2011/0293162 A1   Dec. 1, 2011

Related U.S. Application Data

(60) Provisional application No. 61/347,855, filed on May 25, 2010.

(51) Int. Cl.
*G06K 9/30* (2006.01)
*G06K 9/36* (2006.01)
*G06T 3/00* (2006.01)

(52) U.S. Cl.
USPC ........... 382/130; 382/128; 382/132; 382/283; 382/294; 382/295; 600/382; 600/425; 600/428; 600/509

(58) Field of Classification Search
USPC ................ 382/130, 128, 283, 294, 265, 132; 600/382, 428, 509, 425
See application file for complete search history.

(56) References Cited

U.S. PATENT DOCUMENTS

| | | | |
|---|---|---|---|
| 5,602,891 A * | 2/1997 | Pearlman | 378/62 |
| 5,647,360 A | 7/1997 | Bani-Hashemi et al. | |
| 7,412,023 B2 | 8/2008 | Ohishi et al. | |
| 7,551,721 B2 | 6/2009 | Nakaura et al. | |
| 7,620,443 B2 * | 11/2009 | Kokubun et al. | 600/428 |
| 7,734,078 B2 | 6/2010 | Prince et al. | |
| 7,792,346 B2 | 9/2010 | Lienard et al. | |
| 7,865,227 B2 * | 1/2011 | Mistretta | 600/413 |
| 2007/0073142 A1 * | 3/2007 | Eck et al. | 600/413 |
| 2007/0195932 A1 | 8/2007 | Nakaura et al. | |
| 2007/0201609 A1 | 8/2007 | Ohishi et al. | |

(Continued)

OTHER PUBLICATIONS

Pavlopoulos, "New hybrid stochastic-deterministic technique for fast registration of dermatological images." Med. Biol. Eng. Comput.. 42. (2004): 777-786. Print.*

(Continued)

*Primary Examiner* — Michael A Newman
(74) *Attorney, Agent, or Firm* — Peter Withstandley

(57) ABSTRACT

An image data subtraction system enhances visualization of vessels subject to movement using an imaging system. The imaging system acquires data representing first and second anatomical image sets comprising multiple temporally sequential individual mask (without contrast agent) and fill images (with contrast agent) of vessels respectively, during multiple heart cycles. An image data processor automatically identifies temporally corresponding pairs of images comprising a mask image and a contrast enhanced image and for the corresponding pairs, automatically determines a shift of a contrast enhanced image relative to a mask image to compensate for motion induced image mis-alignment. The image data processor automatically shifts a contrast enhanced image relative to a mask image in response to the determined shift. The image data processor subtracts data representing a mask image of a corresponding pair from a shifted contrast enhanced image of the corresponding pair, to provide multiple subtracted images showing enhanced visualization of vessels.

15 Claims, 14 Drawing Sheets

(56) References Cited

U.S. PATENT DOCUMENTS

| | | |
|---|---|---|
| 2008/0221442 A1 | 9/2008 | Tolkowsky et al. |
| 2009/0116715 A1* | 5/2009 | Bredno et al. ............. 382/130 |
| 2009/0135992 A1* | 5/2009 | Vaillant et al. .................. 378/4 |
| 2010/0160764 A1 | 6/2010 | Steinberg et al. |
| 2010/0161023 A1 | 6/2010 | Cohen et al. |
| 2010/0171819 A1 | 7/2010 | Tolkowsky et al. |
| 2010/0172474 A1 | 7/2010 | Vogt et al. |
| 2010/0172556 A1 | 7/2010 | Cohen et al. |
| 2010/0191102 A1 | 7/2010 | Steinberg et al. |
| 2010/0220917 A1 | 9/2010 | Steinberg et al. |
| 2010/0290693 A1 | 11/2010 | Cohen et al. |

OTHER PUBLICATIONS

Meijering, et al. "Image Registration for Digital Subtraction Angiography." ImageScience.org. ImageScience.org, 1999. Web. May 19, 2013. <http://www.imagescience.org/meijering/research/registration/>.*

Wang, et al. "An Iterative Refinement DSA image Registration Algorithm Using Structural Image Quality Measure." Fifth International Conference on Intelligent Information Hiding and Multimedia Signal Processing. 5. (2009): 973-976. Print.*

Maintz, et al. "A Survey of Medical Image Restoration." Medical Image Analysis. 2.1 (1998): 1-36. Print.*

* cited by examiner

1. Determine a maximum shift value that is accepted in the horizontal direction (M).
2. Determine a maximum shift value that is accepted in the vertical direction (N).

Use +/- 2 for this example in both the horizontal and vertical directions.

3. Build an empty M x N score matrix. Each cell in this matrix represents a shift in the horizontal (x) and vertical (y) directions.

605

|    | -2 | -1 | 0 | 1 | 2 |
|----|----|----|---|---|---|
| 2  |    |    |   |   |   |
| 1  |    |    |   |   |   |
| 0  |    |    |   |   |   |
| -1 |    |    |   |   |   |
| -2 |    |    |   |   |   |

4. Shift the mask frame by (x, y) pixels where x and y correspond to the shift values for each cell in the score matrix.
5. Calculate a similarity measure between the fill frame and the shifted mask frame and fill it into the appropriate cell in the score matrix. For this example a deterministic sign change value (DSC) is calculated.
6. Repeat steps 4 – 5 for each cell in the score matrix.

|    | -2 | -1 | 0  | 1  | 2  |
|----|----|----|----|----|----|
| 2  |    |    |    |    |    |
| 1  |    |    |    | 16 | 14 |
| 0  |    |    | 16 |    |    |
| -1 |    | 20 |    |    |    |
| -2 | 28 |    |    |    | 2  |

Cells of the matrix are filled with calculated DSC values, but for this example, only the five values shown are calculated.

7. The highest DSC in the score matrix is the optimum set of shift values for the image based on the current region.

|    | -2 | -1 | 0  | 1  | 2  |
|----|----|----|----|----|----|
| 2  |    |    |    |    |    |
| 1  |    |    |    | 16 | 14 |
| 0  |    |    | 16 |    |    |
| -1 |    | 20 |    |    |    |
| -2 | 28 |    |    |    | 2  |

Optimum shift values based on region 1 = -2, -2

|   |   |   |   |   | 24 |   |
|---|---|---|---|---|----|---|
| 2 |   |   |   |   |    |   |
| 1 |   |   |   | 30 |    |   |
| 0 |   |   | 26 |   |    |   |
| -1 |   | 26 |   |   |   |   |
| -2 | 24 |   |   |   |   |   |
|   | -2 | -1 | 0 | 1 | 2 |   |

Optimum shift values based on region 2 = 1, 1

8. Repeat steps 1 – 7 for region 2 to produce the score matrix at the right.

9. Repeat steps 1 – 7 for any other regions to be evaluated.

FIGURE 7

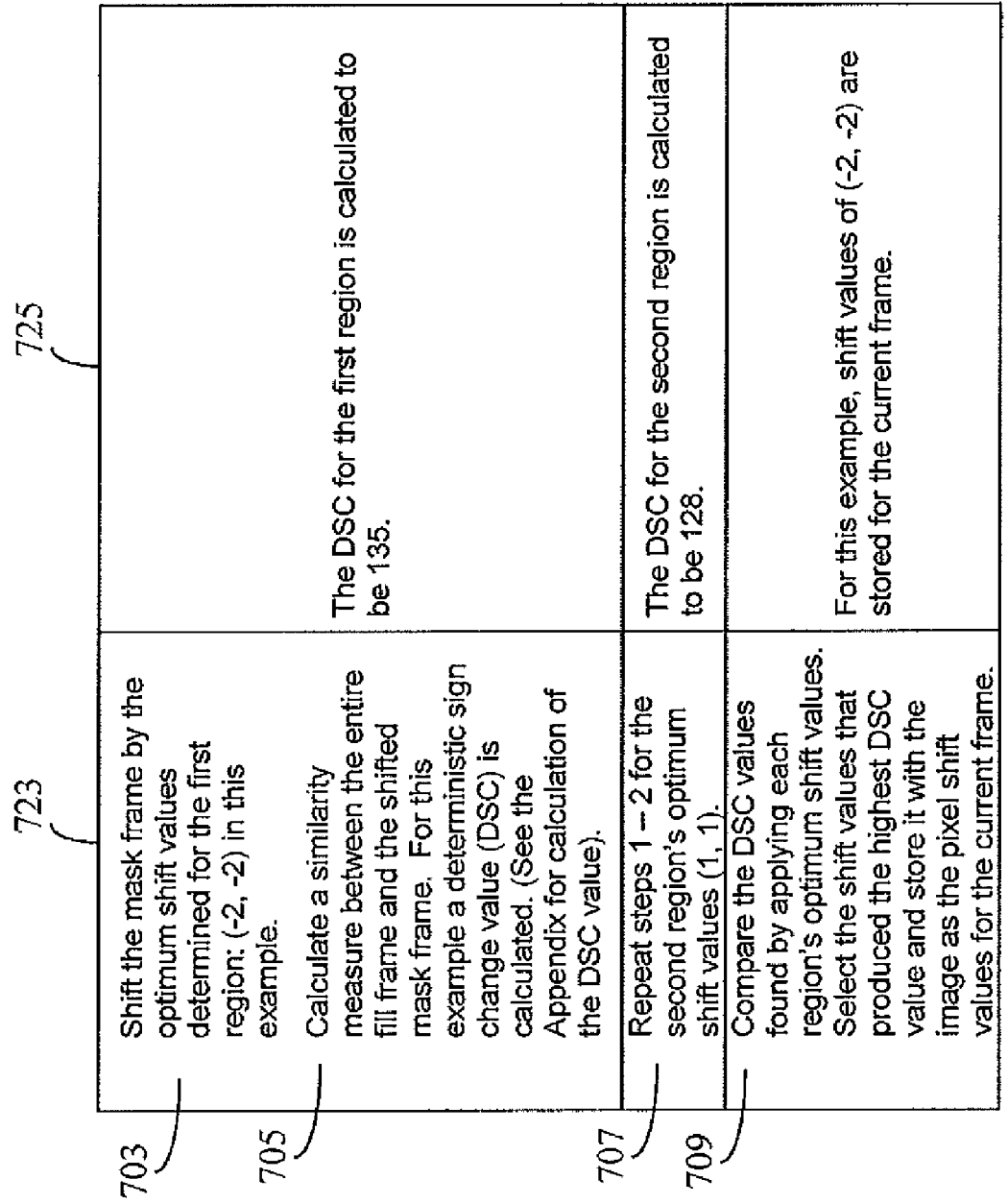

| 703 | Shift the mask frame by the optimum shift values determined for the first region: (-2, -2) in this example. | 725 |
| --- | --- | --- |
| 705 | Calculate a similarity measure between the entire fill frame and the shifted mask frame. For this example a deterministic sign change value (DSC) is calculated. (See the Appendix for calculation of the DSC value). | The DSC for the first region is calculated to be 135. |
| 707 | Repeat steps 1 – 2 for the second region's optimum shift values (1, 1). | The DSC for the second region is calculated to be 128. |
| 709 | Compare the DSC values found by applying each region's optimum shift values. Select the shift values that produced the highest DSC value and store it with the image as the pixel shift values for the current frame. | For this example, shift values of (-2, -2) are stored for the current frame. |

FIGURE 11

| D | | | | | | |
|---|---|---|---|---|---|---|
| -1.2 | -0.8 | -1.2 | 1.2 | 0.8 | 1.2 | |
| -0.8 | -1.2 | -0.8 | -1.2 | 1.2 | -0.2 | |
| -0.2 | -0.8 | 0.8 | 1.2 | -0.2 | 0.2 | |
| 0.2 | -0.2 | 1.2 | 1.8 | 0.2 | -0.2 | |
| -2.2 | -1.8 | -0.2 | 0.2 | -0.2 | 0.2 | |
| -1.8 | -2.2 | 0.2 | -0.2 | -0.8 | -1.2 | |

921

By counting the number of sign changes along the rows of this matrix we arrive at the DSC value of 16 for this region of the fill frame combined with the unshifted mask frame.

MEDICAL IMAGE PROCESSING AND REGISTRATION SYSTEM

This is a non-provisional application of provisional application Ser. No. 61/347,855 filed 25 May, 2010, by M. Pajeau.

FIELD OF THE INVENTION

This invention concerns an image data subtraction system to enhance visualization of vessels subject to movement by compensating for a motion induced shift of a contrast enhanced image relative to a mask image.

BACKGROUND OF THE INVENTION

Subtracted X-ray images are derived by subtracting a mask frame (i.e. an image without contrast agent) from one or more fill frames (i.e. an image with contrast agent) to hide (by "subtracting" out) uninteresting anatomical structures (i.e. bones during a vascular study). In order to perform this subtraction the anatomical structures in the mask frame need to be registered (aligned) with the corresponding structures in the fill frames. If a patient being X-rayed moves during the time between the acquisition of a mask frame and acquisition of a fill frame, the registration between the frames may be rendered incorrect and the anatomical structures may not be accurately subtracted out of a displayed composite image.

Known systems support manual and partially automated image shifting enabling a user to select a region of interest (ROI) in an image and automatic calculation of optimal shift values for pixels that fall within this region to align mask and fill frames. In order to store optimal shift values for frames of a multi-frame image sequence, a user is burdened by a need to visit each frame and perform manual tasks (i.e., manual shifting of a mask frame or manual positioning of a ROI). This is a labor and time-intensive operation. A system according to invention principles addresses this problem and related problems.

SUMMARY OF THE INVENTION

A system automatically calculates optimal horizontal & vertical shift values for each frame of a subtracted medical X-ray image in order to correct linear mis-registration (misalignment) between mask and fill frames. An image data subtraction system enhances visualization of vessels subject to movement using an imaging system. The imaging system acquires data representing a first image set comprising multiple temporally sequential individual mask images of vessels of a portion of patient anatomy during multiple heart cycles in the absence of a contrast agent. The imaging system also acquires data representing a second image set comprising multiple temporally sequential individual contrast enhanced images of vessels of the portion of patient anatomy during multiple heart cycles in the presence of a contrast agent. An image data processor automatically identifies temporally corresponding pairs of images comprising a mask image and a contrast enhanced image and for the corresponding pairs, automatically determines a shift of a contrast enhanced image relative to a mask image to compensate for motion induced image mis-alignment. The image data processor automatically shifts a contrast enhanced image relative to a mask image in response to the determined shift. The image data processor subtracts data representing a mask image of a corresponding pair from a shifted contrast enhanced image of the corresponding pair, to provide multiple subtracted images showing enhanced visualization of vessels.

BRIEF DESCRIPTION OF THE DRAWING

FIGS. 6A and 6B shows a process for calculating a pixel shift value for a region, according to invention principles.

FIG. 7 shows a process for comparing calculated pixel shift values for different regions to determine a best value for an image, according to invention principles.

FIGS. 8-12 are used in calculating a Deterministic Sign Change (DSC) value used in the processes of FIGS. 6 and 7, specifically, FIG. 8 shows a sample fill frame and frame region showing a region for which a DSC values is calculated, according to invention principles.

FIG. 9 shows pixels of a sample fill frame region and corresponding pixel values, according to invention principles.

FIG. 10 shows calculated values of pixels of a sample mask frame region and corresponding pixel values, according to invention principles.

FIG. 11 shows calculated subtraction values derived from pixel values of the mask and fill frame regions of FIGS. 9 and 10 respectively, according to invention principles.

FIG. 12 shows calculated subtraction values derived from pixel values of a shifted mask frame region and un-shifted fill frame region and comparison of the subtraction values with the values of FIG. 11, according to invention principles.

DETAILED DESCRIPTION OF THE INVENTION

A system automatically calculates optimal horizontal and vertical shift values for pixels of each frame of a subtracted medical X-ray image in order to correct for a linear registration (alignment) error between a mask and fill frame due to patient movement occurring between acquisition of these frames. The system automatically corrects for the registration error before or during review of an image following image acquisition. The system linearly shifts a mask flame before subtraction from a fill frame to correct registration between the mask and fill frames to improve the result of subtraction and the clarity of a displayed composite image. The distance to shift the mask frame is either manually set by a user or automatically calculated by a reviewing application. This shift distance may be different for individual mask-fill image pairs in a multi-frame sequence of X-ray images as the patient can move at any point during image acquisition. The system fully automates the selection of a region of interest (ROI) and calculation of optimal shift values for each frame. The system automatically corrects registration of individual images of a multi-frame image sequence without user interaction, eliminating steps and associated resource burden in a user workflow.

Figure 1:
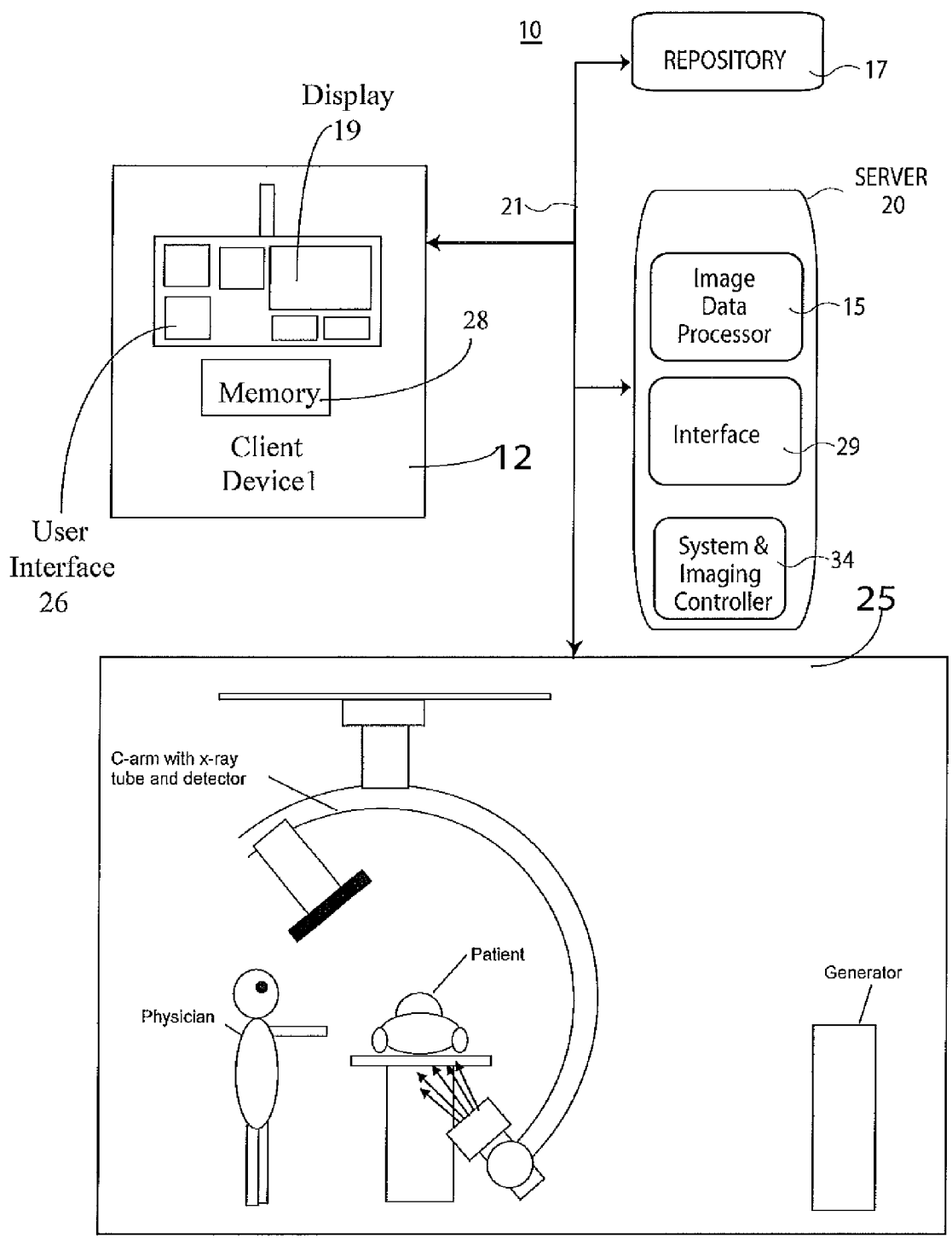
FIG. 1 shows an image data subtraction system to enhance visualization of vessels subject to movement, according to invention principles.

FIG. 1 shows an Angiographic X-ray imaging system 10. System 10 includes one or more processing devices (e.g., workstations or portable devices such as notebooks, Personal Digital Assistants, phones) 12 that individually include a user interface control device 26 such as a keyboard, mouse, touchscreen, voice data entry and interpretation device, display 19 and memory 28. System 10 also includes at least one repository 17, X-ray imaging modality system 25 (which in an alternative embodiment may comprise an MR (magnetic resonance) or CT scan device, for example) and server 20 intercommunicating via network 21. X-ray modality system 25 comprises a C-arm X-ray radiation source and detector device rotating about a patient table and an associated electrical generator for providing electrical power for the X-ray radiation system. The display images are generated in response to predetermined user (e.g., physician) specific preferences. At least one repository 17 stores medical image studies for multiple patients in DICOM compatible (or other) data format. A medical image study individually includes multiple image series of a patient anatomical portion which in turn individually include multiple images. Server 20 includes interface 29, image data processor 15 and system and imaging controller 34. Display 19 presents display images comprising a Graphical User Interface (GUI). Imaging controller 34 controls operation of imaging device 25 in response to user commands entered via user interface 26. In alternative arrangements, one or more of the units in server 20 may be located in device 12 or in another device connected to network 21. Interface 29 receives an electrical signal representing a heart cycle electrical waveform occurring over multiple heart cycles and image data processor 15 uses the electrical signal to identify pairs of images comprising a mask image and a contrast enhanced image.

Imaging system 25 acquires data representing a first image set comprising multiple temporally sequential individual mask images (mask frames) of vessels of a portion of patient anatomy during multiple heart cycles in the absence of a contrast agent. System 25 acquires data representing a second image set comprising multiple temporally sequential individual contrast enhanced images (fill frames) of vessels of the portion of patient anatomy during multiple heart cycles in the presence of a contrast agent. Image data processor 15 automatically identifies temporally corresponding pairs of images comprising a mask image and a contrast enhanced image. Image data processor 15, for the corresponding pairs, automatically determines a shift of a contrast enhanced image relative to a mask image to compensate for motion induced image mis-alignment and automatically shifts a contrast enhanced image relative to a mask image in response to the determined shift. Processor 15 subtracts data representing a mask image of a corresponding pair from a shifted contrast enhanced image of the corresponding pair, to provide multiple subtracted images showing enhanced visualization of vessels.

Figure 2:
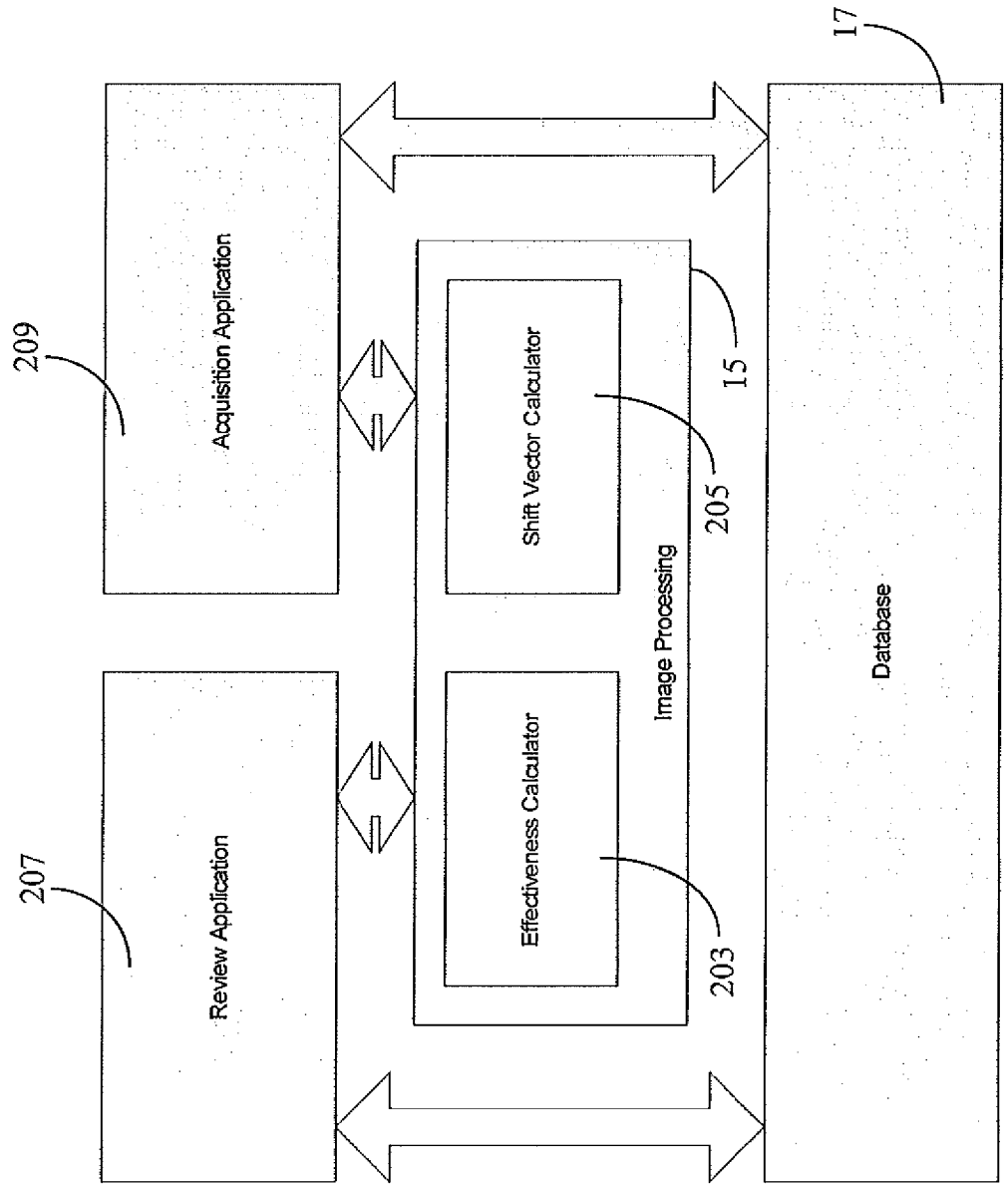
FIG. 2 shows an image data processor system, according to invention principles.

FIG. 2 shows an image data processor system employed by system 10 (FIG. 1). Image data processor 15 is responsive to image data received from acquisition application 209 of unit 25 and commands and data from review application 207 of unit 12. Processor 15 employs shift vector calculator 205 for determining candidate shifts to apply to a mask image and effectiveness calculator 203 determines the best shift of the calculated shifts to apply to the mask image.

Figure 3:
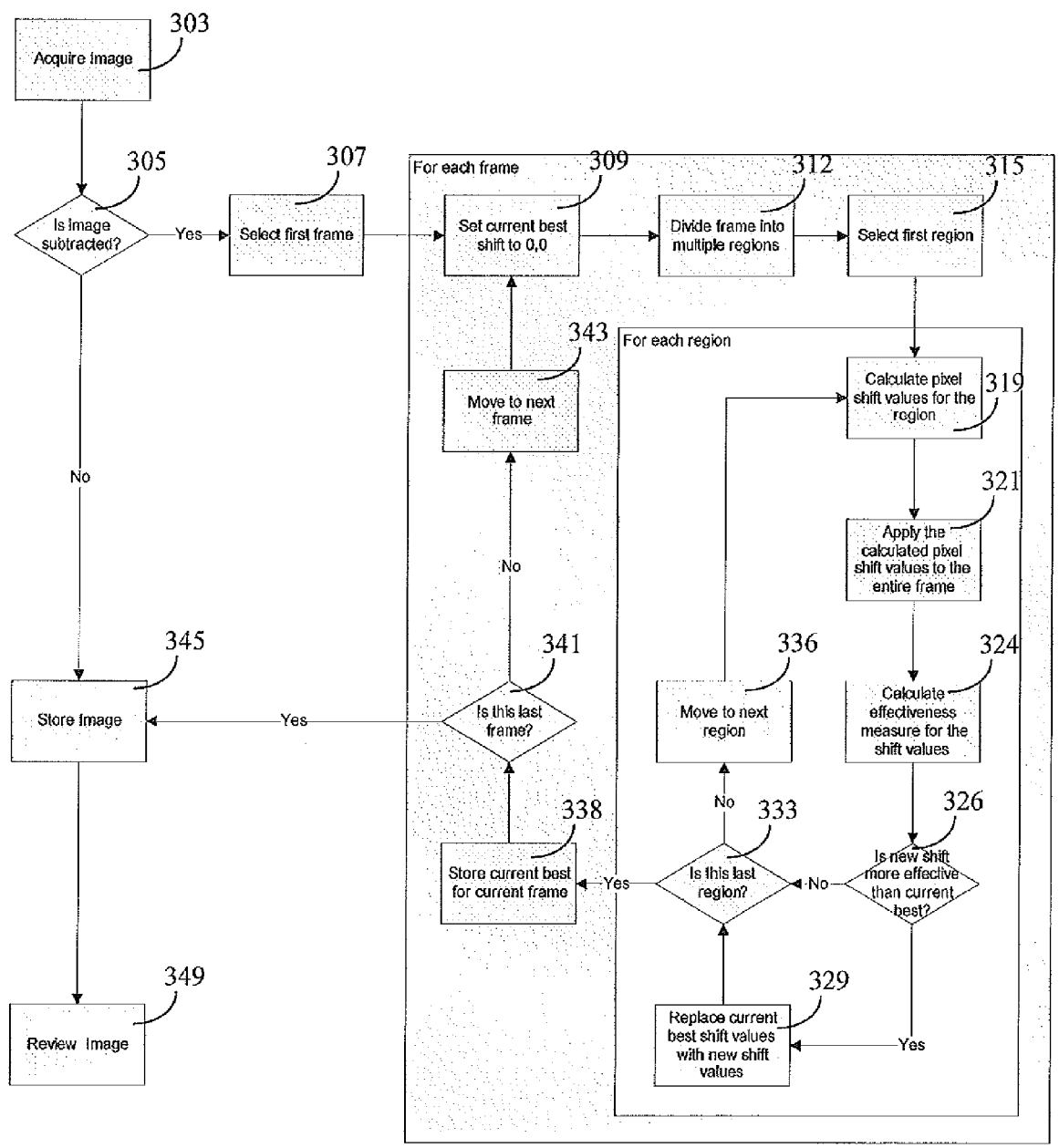
FIG. 3 shows a flowchart of a process used by an image data processor system, according to invention principles.
Figure 4:
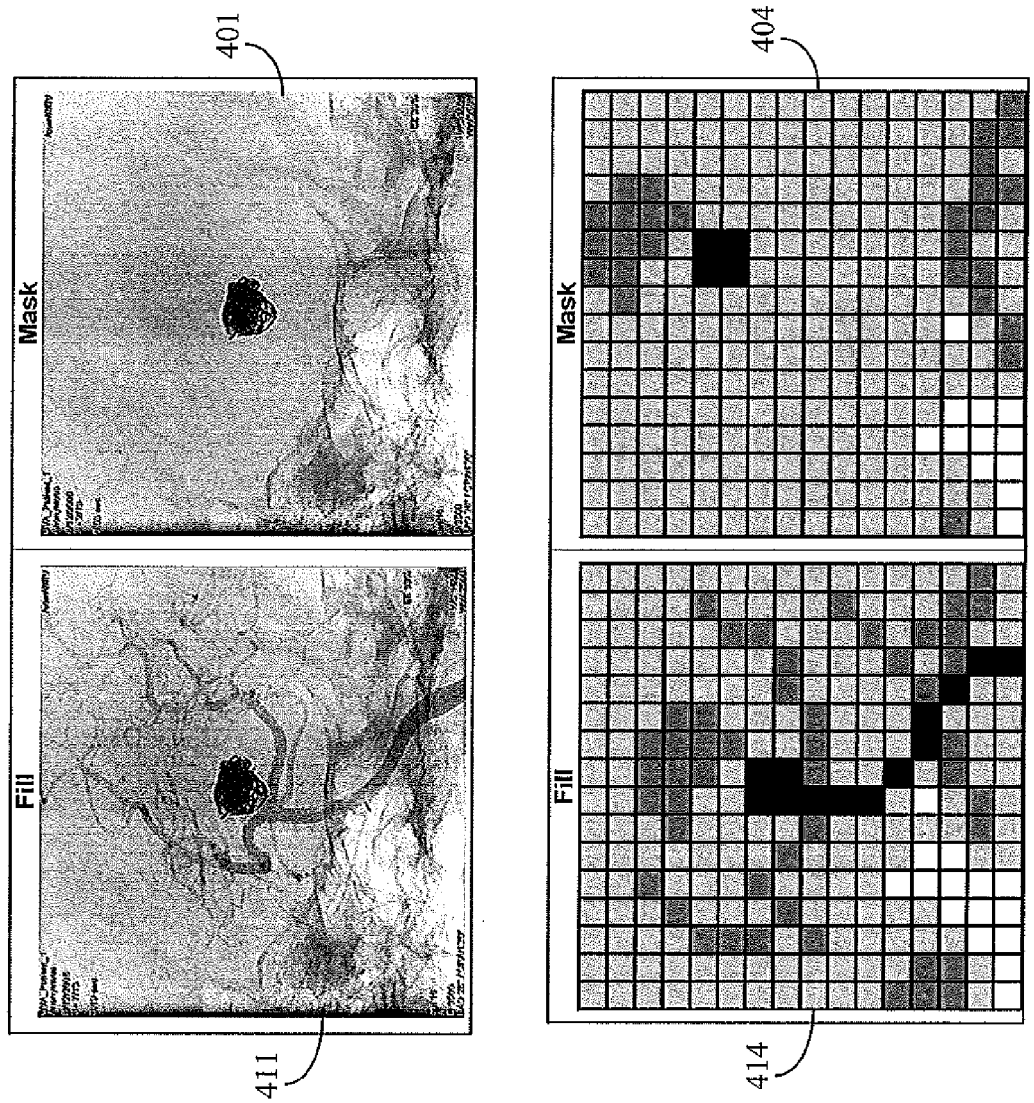
FIG. 4 shows mask and fill frames and corresponding simplified versions of the frames illustrating movement occurring between acquisition of the frames, according to invention principles.

FIG. 3 shows a flowchart of a process used by image data processor 15. In step 305, if a sequence of digitally subtracted images is to be formed using images acquired in step 303, a first frame is selected in step 307. Digitally subtracted X-ray images are derived by subtracting a mask frame (i.e. an image without contrast agent) from one or more fill frames (i.e. an image with contrast agent) to eliminate uninteresting static anatomical structures. FIG. 4 shows mask and fill frames and corresponding simplified versions of the frames illustrating the effect of patient movement occurring between acquisition of the frames. A patient has exhaled between the acquisition of mask frame 401 and fill frame 411, for example. This results in the upper right and lower left portions of fill frame 411 being closer together than they are in mask frame 401. Pixelated images 404 and 414 are simplified versions of corresponding mask frame 401 and fill frame 411, respectively that exaggerate the effect of patient movement in the images.

Figure 5:
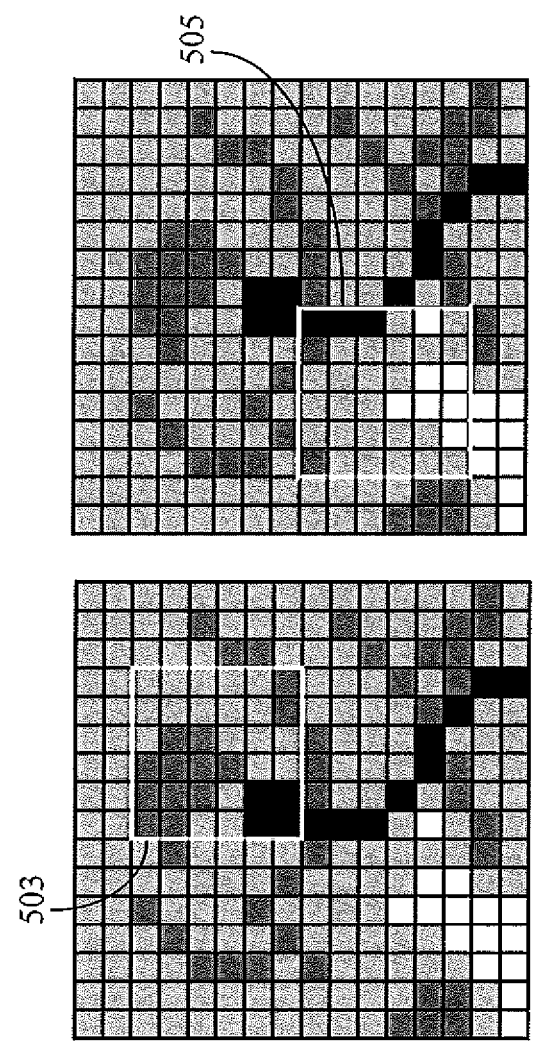
FIG. 5 illustrates selection of multiple regions of a fill frame for use in calculating shift values to compensate for movement occurring between acquisition of the frames, according to invention principles.

Steps 309-343 are performed by processor 15 for each frame of the image sequence to automatically select shift values for individual fill frames. An initial pixel shift of (0, 0) i.e. x and y coordinate shifts of zero, is selected in step 309 and the first frame is divided into multiple different regions in step 312. FIG. 5 illustrates selection of multiple regions of a fill frame for use in calculating shift values to compensate for movement occurring between acquisition of the frames. Specifically, processor 15 automatically selects a first region 503 and a second region 505, for example. Processor 15 in step 319 calculates a pixel shift for a region selected in step 315 from the regions determined in step 312 and applies the pixel shift in step 321 to the entire first frame.

FIGS. 6A and 6B shows a table indicating a process automatically performed by processor 15 for calculating a pixel shift value for a region. Column 603 shows steps 1-9 of a process used to calculate a region pixel shift value and column 605 shows results of corresponding steps of column 603. Processor 15 in step 1 determines a maximum shift value that is accepted in a horizontal direction (M) and in step 2 determines a maximum shift value that is accepted in the vertical direction (N). In step 3 processor 15 builds an empty M×N score matrix. Each cell in this matrix represents a shift in the horizontal (x) and vertical (y) directions. Processor 15 in step 4, shifts a mask frame by (x, y) pixels where x and y correspond to the shift values for each cell in the score matrix. In step 5, processor 15 calculates a similarity measure (a deterministic sign change value (DSC), for example) between a fill frame and the shifted mask frame and incorporates the calculated similarity measure into an appropriate cell in the score matrix, Processor 15 calculates a deterministic sign change value (DSC) as described later in connection with FIGS. 8-12. Processor 15 repeats steps 4-5 to calculate a DSC similarity measure for each cell in the score matrix. The highest DSC in the score matrix 607 indicates the optimum shift value for a mask image for a current region and processor 15 selects the corresponding shift values for the current region. Processor 15 repeats steps 1-7 for region 2 to produce the score matrix 609 shown in column 605 and repeats steps 1-7 for other regions that are to be evaluated.

Continuing with the process of FIG. 3, processor 15 in step 321 applies the calculated pixel shift values for the region selected in step 315 to the entire first frame. In step 324, processor 15 calculates an effectiveness measure for the shift values. If it is determined in step 326 that newly calculated shift values for a region are more effective than previously calculated shift values for a different region, processor 15 replaces the previous values with the newly calculated shift values in step 329.

FIG. 7 shows a table indicating a process for comparing calculated pixel shift values for different regions to determine a best value for an image. Column 723 shows steps 703, 705, 707 and 709 of a process used to compare calculated pixel shift values for different regions and column 725 shows results of corresponding steps of column 723. Processor 15 in step 703 shifts a mask frame by the optimum shift values determined for the first region, (−2, −2) in this example. In step 705, processor 15 calculates a similarity measure (a deterministic sign change value (DSC), for example) between an entire fill frame and the shifted mask frame. In step 707, processor 15 repeats steps 703 and 705 for a second region having shift values (1, 1). In step 709, processor 15 compares the DSC values found for the corresponding different regions. Processor 15 selects the shift values (here (−2, −2)) that produced the highest DSC value and stores it with the image as the pixel shift values for a current mask frame.

Continuing with FIG. 3, if it is determined in steps 333 and 341 that processor 15 has completed processing of the last region for the last frame, the optimum calculated shift values of the different regions is applied to the fill frame. This is done by automatically shifting the fill frame relative to a mask frame in response to the determined optimum calculated shift values stored in step 338 and by subtracting the mask frame from the fill frame to form a subtracted image that is stored in step 345 for review by a user in step 349. Thereby, processor 15 applies subtraction to each region using the calculated shift values, calculates an effectiveness measure for each region's subtraction and compares the effectiveness measures of the multiple different regions. If it is determined in step 333 that processor 15 has not completed processing the different regions, a next region is selected in step 336 and the process of steps 319 to 336 are iteratively repeated for each region. If it is determined in steps 333 and 341 that processor 15 has not completed processing, a next frame of the sequence is selected in step 343 and the process of steps 309 to 343 are repeated for each frame of the sequence.

System 10 (FIG. 1) performs the process of FIG. 3 for individual fill frames of an image sequence either as it is acquired or transparently in the background after image acquisition is complete, enabling a user to concurrently perform other tasks and eliminating a need for a user to access each frame of an acquired sequence. The system advantageously determines and applies a substantially optimal automatic pixel shift to each individual image frame as an image is acquired or stored. In operation, before (or concurrent with) image storage, image data processor 15 selects multiple regions of an individual image to calculate shift values. In response to selection of 2 regions for example, processor 15 selects a first fill frame in an image in a current frame, calculates optimum pixel shift values for each region and compares the effectiveness of the optimum shift values for the regions to determine which shift value is the best for the entire image. Processor 15 selects a next fill frame of an image sequence and repeats the process until shift values have been stored for the frames of the image sequence.

Figure 8:
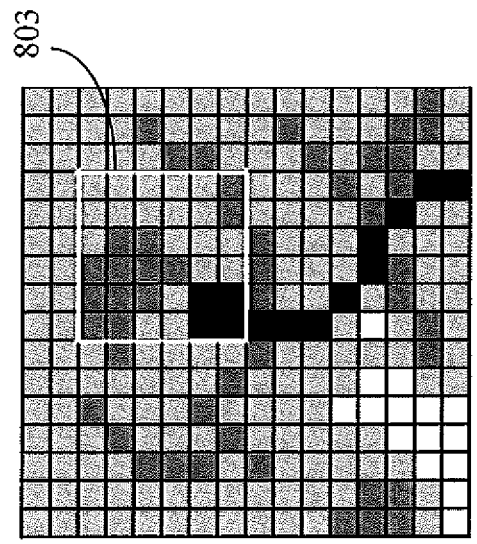

FIGS. 8-12 are used in calculating a Deterministic Sign Change (DSC) value used in the processes of FIGS. 6 and 7, specifically, FIG. 8 shows a sample image showing a region for which a DSC values is calculated. FIG. 8 shows a 16×16 pixel image and image data processor 15 calculates a deterministic sign change value (DSC) for selected 6×6 pixel region 803. Processor 15 calculates a DSC value for an entire image in a similar manner to a region within an image. Some pixels at the edges of an image are not included in one embodiment because they become un-subtracted when a mask frame is shifted away from them. System 10 may discard some rows or columns of pixels at the edges of an image in order to ensure a DSC value is calculated for the same number of pixels when comparing effectiveness of a particular shift value.

Figure 9:
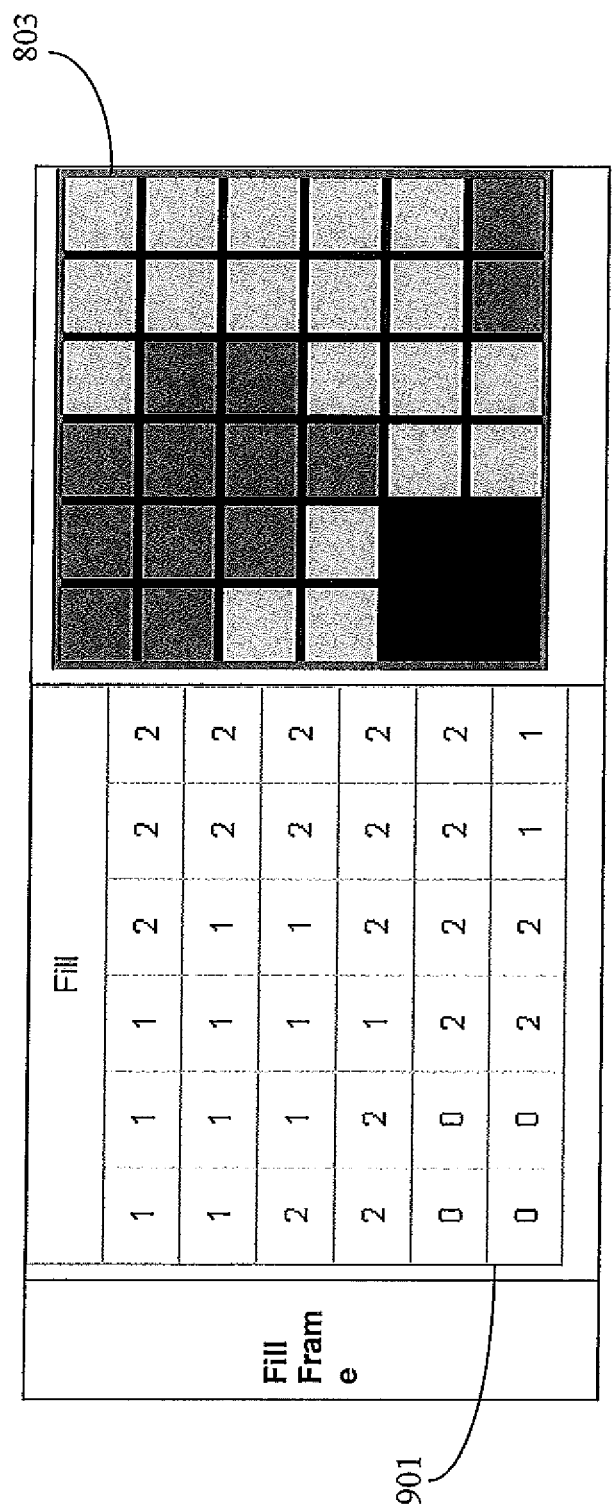
Figure 10:
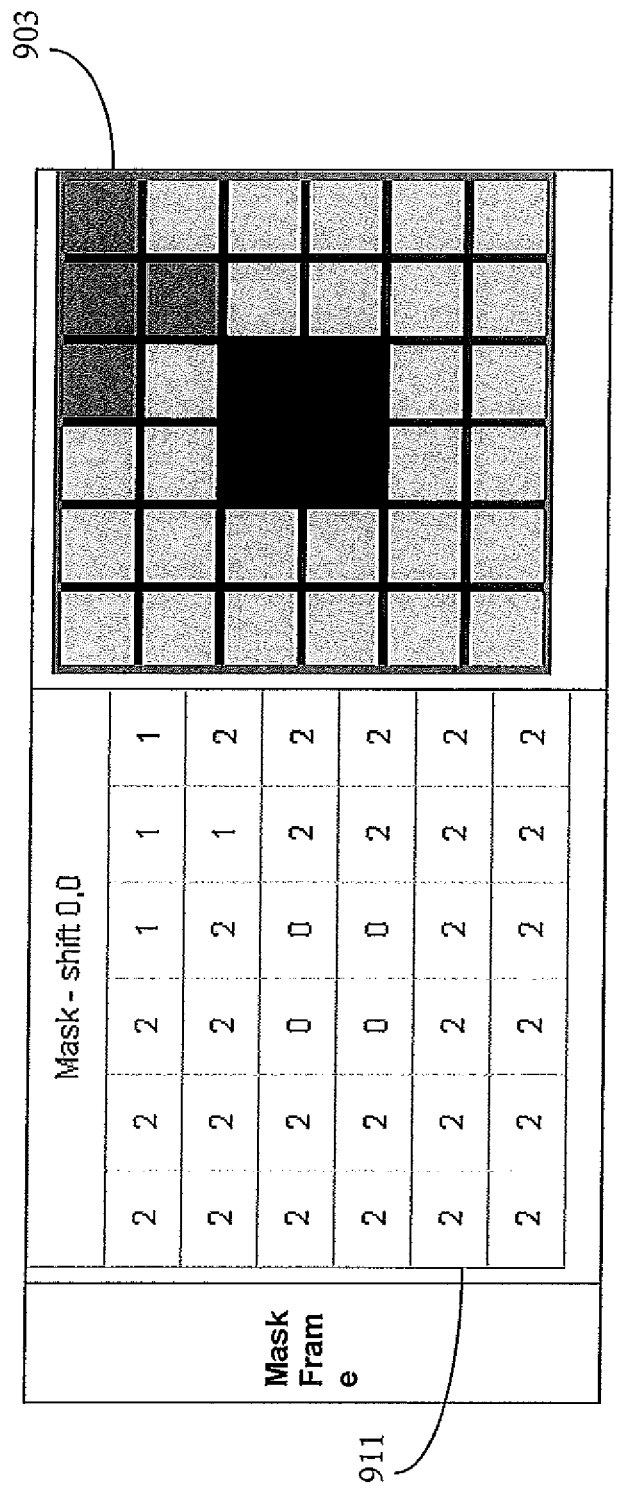

FIG. 9 shows pixels of sample fill frame region 803 and corresponding pixel value matrix 901. In this example, system 10 performs a DSC calculation using simplified gray values for each pixel in selected region 803 (0=black, 1=dark gray, 2=light gray, 3 white). FIG. 10 shows calculated values of pixels of sample mask frame region matrix 903 corresponding to fill frame region 803 and associated corresponding pixel values 911. Processor 15 calculates a subtracted value D(x, y) for each pixel using this formula:

$$D(x,y)=F(x,y)-M(x,y)+(-1)^{(x+y)} \cdot q$$

Where:

F(x, y)=a gray value of a fill frame region 803 pixel at horizontal coordinate x and vertical coordinate y, M(x, y)=a gray value of a corresponding mask frame region 903 pixel at horizontal coordinate x and vertical coordinate y and Q=a small real or integer value related to the signal-to-noise ratio of the original image (0.2 was used for this example). FIG. 11 shows calculated subtraction values D(x, y) in matrix 921 derived from pixel values of the mask and fill frame regions 803 and 903 of FIGS. 9 and 10 respectively. Processor 15 counts the number of sign changes along the rows of matrix 921 to determine a DSC value of 16 for this region of the fill frame combined with the corresponding region of the un-shifted mask frame.

Figure 12:
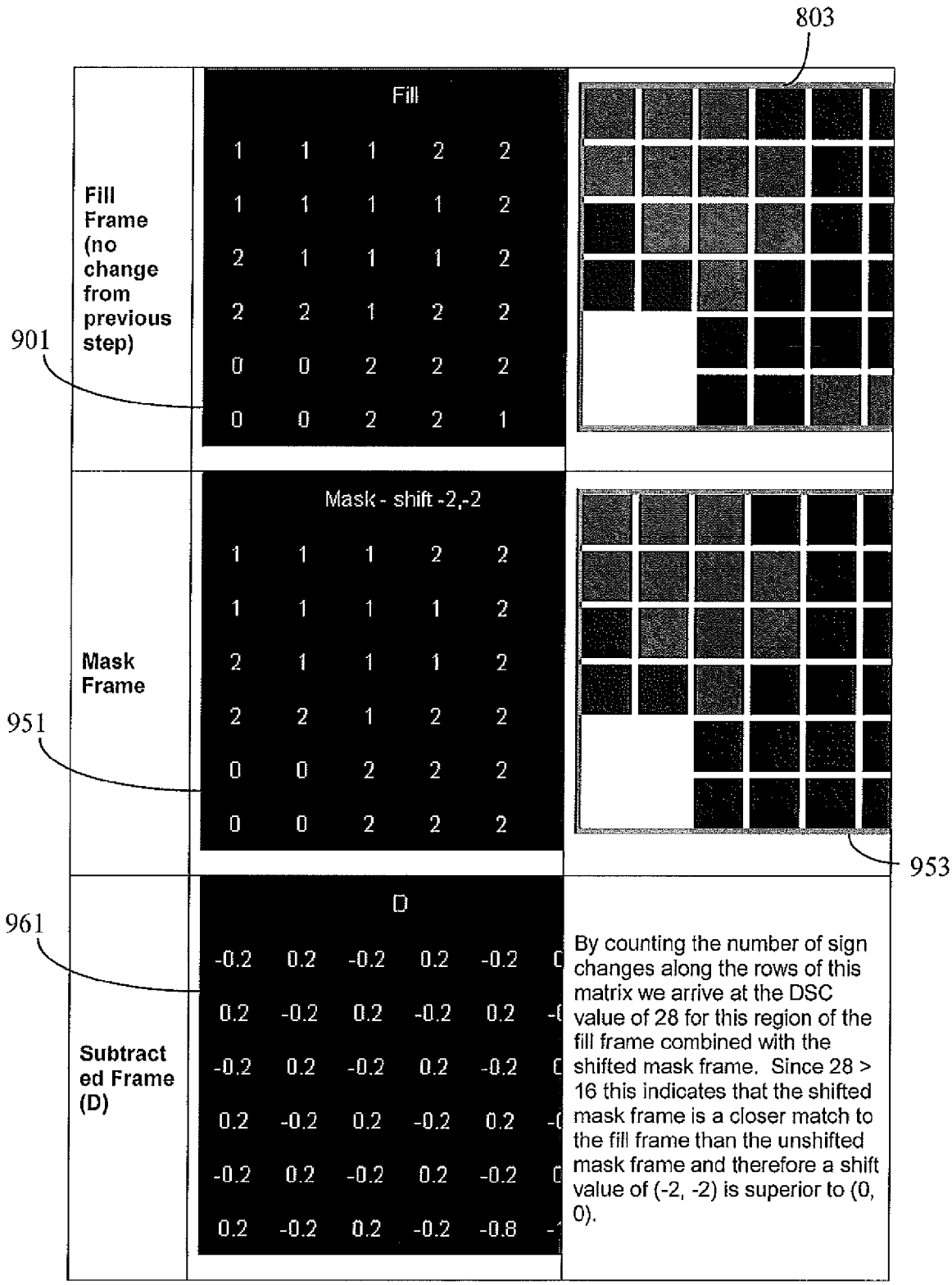

FIG. 12 shows calculated subtraction values derived from pixel values of a shifted mask frame region and corresponding un-shifted fill frame region and comparison of the subtraction values with the values of FIG. 11. Specifically, the mask frame region is shifted down by two pixels and to the left by two pixels (shift value of (−2, −2)) as shown in pixels 953 (compared with pixels 903 of FIG. 10) and has the corresponding pixel values of matrix 951. Matrix 961 shows calculated subtraction values D(x, y) derived from pixel values of the shifted mask and fill frame regions 803 and 953 respectively. Processor 15 counts the number of sign changes along the rows of matrix 961 to determine a DSC value of 28 for this region of the fill frame combined with the corresponding region of the shifted mask frame. Since 28 is greater than 16 this indicates that the shifted mask frame is a closer match to the fill frame than the un-shifted mask frame and therefore a shift value of (−2, −2) is superior to a zero shift (0, 0).

Figure 13:
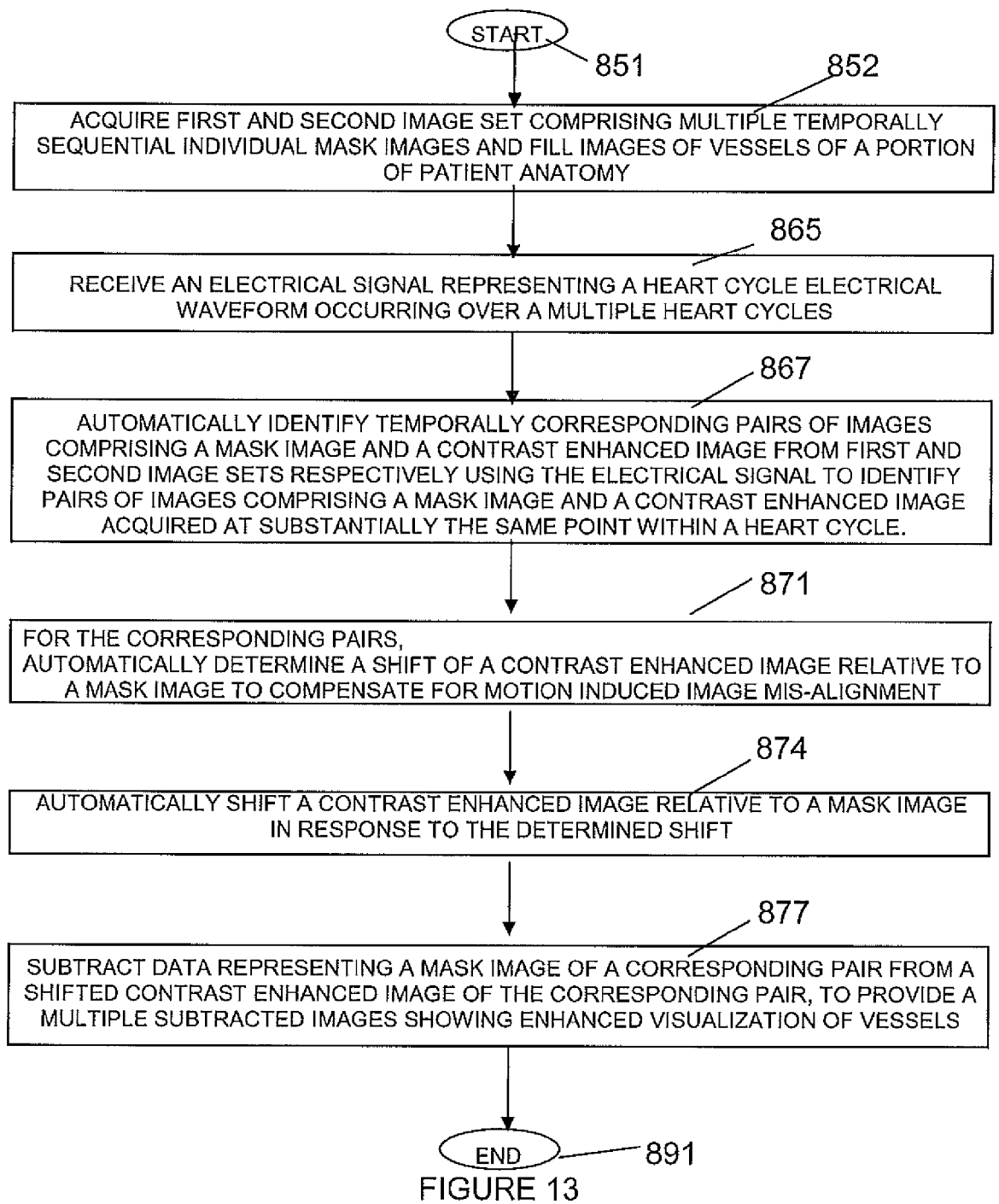
FIG. 13 shows a flowchart of a process used by an image data subtraction system to enhance visualization of vessels subject to movement, according to invention principles.

FIG. 13 shows a flowchart of a process used by an image data subtraction system to enhance visualization of vessels subject to movement. In step 852 following the start at step 851, imaging system 25 acquires data representing a first image set comprising multiple temporally sequential individual mask images of vessels of a portion of patient anatomy during multiple heart cycles in the absence of a contrast agent. Imaging system 25 also acquires data representing a second image set comprising multiple temporally sequential individual contrast enhanced images of vessels of the portion of patient anatomy during multiple heart cycles in the presence of a contrast agent. In step 865, interface 29 receives an electrical signal representing a heart cycle electrical waveform occurring over multiple heart cycles.

Image data processor 15 in step 867 automatically identifies temporally corresponding pairs of images comprising a mask image and a contrast enhanced image from first and second image sets respectively by using the electrical signal to identify pairs of images comprising a mask image and a contrast enhanced image acquired at substantially the same point within a heart cycle. Image data processor 15 automatically selects multiple different regions within a contrast enhanced image as regions encompassing objects corresponding to objects in a mask frame. In step 871, for the corresponding pairs, image data processor 15 automatically determines a shift of a contrast enhanced image relative to a mask image to compensate for motion induced image mis-alignment. Image data processor 15 automatically determines the shift by determining multiple shifts for multiple different regions within a contrast enhanced image relative to corresponding regions within a mask image and selects the shift from the multiple shifts. Image data processor 15 automatically compares the multiple of shifts and selects the shift from the multiple of shifts by determining a shift effectiveness measure for individual shifts of the multiple of shifts and by selecting the shift as a shift with the highest effectiveness measure. In one embodiment, the shift effectiveness measure comprises a deterministic sign change value (DSC).

In step 874, processor 15 automatically shifts a contrast enhanced image relative to a mask image in response to the determined shift. In step 877 image data processor 15 subtracts data representing a mask image of a corresponding pair from a shifted contrast enhanced image of the corresponding pair, to provide multiple subtracted images showing enhanced visualization of vessels. The process of FIG. 13 terminates at step 891.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication therebetween. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-13 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system automatically calculates optimal horizontal and vertical shift values for each frame of a subtracted medical X-ray image sequence in order to correct linear registration between mask and fill frames before or during review of an image frame following image frame acquisition. Further, the processes and applications may, in alternative embodiments, be located on one or more (e.g., distributed) processing devices on a network linking the units of FIG. 1. Any of the functions and steps provided in FIGS. 1-13 may be implemented in hardware, software or a combination of both.

What is claimed is:

1. An image data subtraction system to enhance visualization of vessels subject to movement, comprising:
   an image data processor for,
      automatically identifying temporally corresponding pairs of images comprising a mask image and a contrast enhanced image from first and second image sets respectively and
      for said corresponding pairs,
      automatically determining a shift of a contrast enhanced image relative to a mask image to compensate for motion induced image mis-alignment by,
         determining a plurality of candidate shifts for a plurality of different individual regions of said contrast enhanced image relative to corresponding regions of said mask image to compensate for mis-alignment of said individual regions,
         applying said candidate shifts to said contrast enhanced image as a whole and
         determining an optimal shift of said candidate shifts based on effectiveness of shifts of said contrast enhanced image as a whole and
      automatically shifting a contrast enhanced image relative to a mask image in response to the determined optimal shift and
      subtracting data representing a mask image of a corresponding pair from a shifted contrast enhanced image of said corresponding pair, to provide a plurality of subtracted images showing enhanced visualization of vessels.

2. A system according to claim 1, including
an imaging system for,
acquiring data representing a first image set comprising a plurality of temporally sequential individual mask images of vessels of a portion of patient anatomy during a plurality of heart cycles in the absence of a contrast agent and
acquiring data representing a second image set comprising a plurality of temporally sequential individual contrast enhanced images of vessels of said portion of patient anatomy during a plurality of heart cycles in the presence of a contrast agent.

3. A system according to claim 1, wherein
said image data processor automatically divides said contrast enhanced image into multiple different regions individually comprising a plurality of pixels.

4. A system according to claim 3, wherein
said image data processor automatically selects said optimal shift of said candidate shifts by determining a shift effectiveness measure for individual shifts of said plurality of shifts.

5. A system according to claim 4, wherein
said image data processor automatically compares said plurality of shifts and selects said shift as a shift with the highest effectiveness measure.

6. A system according to claim 4, wherein
said shift effectiveness measure comprises a deterministic sign change value (DSC).

7. A system according to claim 1, including
an interface for receiving an electrical signal representing a heart cycle electrical waveform occurring over a plurality of heart cycles and wherein
said image data processor uses said electrical signal to identify pairs of images comprising a mask image and a contrast enhanced image acquired at substantially the same point within a heart cycle.

8. A system according to claim 1, wherein
said image data processor,
automatically selects a plurality of different regions within a contrast enhanced image as regions encompassing objects corresponding to objects in a mask frame and
determines said shift by determining a plurality of shifts for said plurality of different regions within a contrast enhanced image relative to corresponding regions within a mask image.

9. An image data subtraction system to enhance visualization of vessels subject to movement, comprising:
an image data processor for,
automatically identifying temporally corresponding pairs of images comprising a mask image and a contrast enhanced image and
for said corresponding pairs,
automatically determining a shift of a mask image relative to a contrast enhanced image to compensate for motion induced image mis-alignment by,
determining a plurality of candidate shifts for a plurality of different individual regions of said mask image relative to corresponding regions of said contrast enhanced image to compensate for mis-alignment of said individual regions,
applying said candidate shifts to said mask image as a whole and
determining an optimal shift of said candidate shifts based on effectiveness of shifts of said mask image as a whole and automatically shifting a mask image relative to a contrast enhanced image in response to the determined optimal shift and
subtracting data representing a shifted mask image of a corresponding pair from a contrast enhanced image of said corresponding pair, to provide a plurality of subtracted images showing enhanced visualization of vessels.

10. A system according to claim 9, wherein
said image data processor automatically divides said mask image into multiple different regions individually comprising a plurality of pixels.

11. A system according to claim 10, wherein
said image data processor automatically selects said optimal shift of said candidate shifts by determining a shift effectiveness measure for individual shifts of said plurality of shifts.

12. A system according to claim 11, wherein
said image data processor automatically compares said plurality of shifts and selects said shift as a shift with the highest effectiveness measure.

13. A method for subtracting image data to enhance visualization of vessels subject to movement, comprising the activities of:
automatically identifying temporally corresponding pairs of images comprising a mask image and a contrast enhanced image from first and second image sets respectively, and
for said corresponding pairs,
automatically determining a shift of a contrast enhanced image relative to a mask image to compensate for motion induced image mis-alignment by,
determining a plurality of candidate shifts for a plurality of different individual regions of said contrast enhanced image relative to corresponding regions of said mask image to compensate for mis-alignment of said individual regions,
applying said candidate shifts to said contrast enhanced image as a whole and
determining an optimal shift of said candidate shifts based on effectiveness of shifts of said contrast enhanced image as a whole and automatically shifting a contrast enhanced image relative to a mask image in response to the determined shift and
subtracting data representing a mask image of a corresponding pair from a shifted contrast enhanced image of said corresponding pair, to provide a plurality of subtracted images showing enhanced visualization of vessels.

14. A method according to claim 13, including the activities of
acquiring data representing a first image set comprising a plurality of temporally sequential individual mask images of vessels of a portion of patient anatomy during a plurality of heart cycles in the absence of a contrast agent and
acquiring data representing a second image set comprising a plurality of temporally sequential individual contrast enhanced images of vessels of said portion of patient anatomy during a plurality of heart cycles in the presence of a contrast agent.

15. A method according to claim 13, including the activity of
automatically dividing said contrast enhanced image into multiple different regions individually comprising a plurality of pixels.

* * * * *